United States Patent
Belli

(10) Patent No.: US 10,961,490 B2
(45) Date of Patent: Mar. 30, 2021

(54) FERMENTATION BASKET

(71) Applicant: Joseph N. Belli, Healdsburg, CA (US)

(72) Inventor: Joseph N. Belli, Healdsburg, CA (US)

(*) Notice: Subject to any disclaimer, the term of this patent is extended or adjusted under 35 U.S.C. 154(b) by 313 days.

(21) Appl. No.: 15/934,554

(22) Filed: Mar. 23, 2018

(65) Prior Publication Data

US 2018/0346852 A1  Dec. 6, 2018

Related U.S. Application Data

(60) Provisional application No. 62/476,394, filed on Mar. 24, 2017.

(51) Int. Cl.
  *C12G 1/00*  (2019.01)
  *C12G 1/02*  (2006.01)

(52) U.S. Cl.
  CPC .............. *C12G 1/005* (2013.01); *C12G 1/02* (2013.01)

(58) Field of Classification Search
  CPC .................................. C12G 1/005; C12G 1/02
  See application file for complete search history.

(56) References Cited

U.S. PATENT DOCUMENTS

| 734,774 A * | 7/1903 | Szafka | A01F 15/04 100/143 |
| 3,635,145 A * | 1/1972 | Nardella | B30B 9/06 99/277.1 |
| 3,685,508 A * | 8/1972 | Heilmann | A47J 27/17 126/378.1 |
| 2006/0000362 A1* | 1/2006 | Roleder | C12G 3/07 99/277.1 |

FOREIGN PATENT DOCUMENTS

CA  2914161 A1 * 3/2015 ............. C12C 11/00

* cited by examiner

*Primary Examiner* — Jason L Vaughan
*Assistant Examiner* — Amanda Kreiling
(74) *Attorney, Agent, or Firm* — Craig M. Stainbrook; Stainbrook & Stainbrook, LLP

(57) ABSTRACT

A fermentation basket for suspension in a fermentation tank during wine fermentation which includes a perforated bottom side, at least one perforated vertical side, an open top side having an upper edge with a circumference or perimeter, cable or chain connecting elements disposed around said upper edge for connecting a hoist cable or chain to hoist said filtration basket, and hanging structure disposed around said upper edge for suspending said filtration basket in the interior of a fermentation tank such that said bottom side is spaced apart from the bottom of the fermentation tank.

15 Claims, 21 Drawing Sheets

FERMENTATION BASKET

CROSS REFERENCES TO RELATED APPLICATIONS

The present application claims priority to U.S. Provisional Patent Application Ser. No. 62/476,394, filed Mar. 24, 2017.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The invention relates most generally to automatic fermentation tanks, more particularly for making wine, and still more particularly to a stainless steel fermentation tank in which tank entry and must/pumice removal is obviated with a removable novel strainer basket.

Background Discussion

In the most general terms, the process of wine making can be reduced to five broad processes or production steps: (1) grape harvesting, (2) crushing/destemming and pressing, (3) fermentation, (4) clarification, and (5) aging and bottling. Sub-steps comprising variations on these principal steps provide the opportunity for highly customized and personalized production.

After harvest and sorting, grapes are destemmed and crushed. Free run juice may be pulled off for special production or combined with the must for fermentation. In white wine production stems, seed, skins and other solids are quickly separated from the juice to prevent color and tannins from being imparted to the wine. By contrast, juice is left in contact with the skins in red wine production to impart color and tannins to the juice. The "young wine" is a suspension known as the must.

The next phase in production is fermentation. It may be initiated naturally over the course of the first day after crush, using airborne wild yeast, or it may be initiated by inoculating the must with cultured yeasts. Fermentation is monitored and discontinued when the sugars are converted into alcohol.

Clarification comes next. This entails removing solids from the must. Thus, dead yeast cells, tannins, and various proteins are removed, and the wine is then "racked" (i.e., transferred) into a vessel where it is fined and/or filtered. These processes "clarify" the wine. After clarification, the wine is again racked into a storage tank where it can be aged until bottling.

Stainless steel tanks have been in use in wine production since the 1960's. Jacketed vessels enable the winemaker to control fermentation temperatures, minimize oxidation and bacterial contamination, all while being chemically neutral and remaining entirely unreactive with acid wine juice, thus imparting no flavor characteristics to the wine.

While most stainless steel tanks have closed tops with an access door (typically a manway for larger tanks), some may be left uncovered or selectively covered with a removable and/or a hinged lid. Nearly all stainless tanks employed in wine production include a pitched floor sloping to a drain, along with various fittings and ports for removing or introducing liquids or other substances used in the production process. Access through the top of a fermentation tank is essential in red wine production for either punching down the cap or pumping over the cap using a hose coupled to a lower outlet to a pump-over cart with a sump and filter. The same outlet may be used for racking. These tank structures and features facilitate handling of the liquid throughout the production process.

To date the process of racking invariably involved the transfer of wine from fermentation vessels to secondary fermentation or storage vessels.

BRIEF SUMMARY OF THE INVENTION

Embodiments of the present invention include a stainless steel fermentation basket sized for placement in a stainless steel fermentation tank modified to suspend the fermentation basket within the tank interior. The fermentation basket has a geometry and an external dimension to provide a separation space between the basket wall and the tank wall using an upper circumferential or perimeter rim (an angle) which is disposed over a basket welded to the tank interior.

The fermentation basket further includes lifting tabs provided with connecting structure for coupling to cables, lines or hooks on an overhead crane, lift, or hoist, or a forklift, and it is perforated about its floor (bottom) and side, such that when it is removed from the tank, solids larger than the perforation holes remain in the basket while liquids remain in the tank. This obviates the need for tank entry, water usage and general manpower, with considerable savings in time, cost, and space resulting.

In another embodiment, the fermentation basket includes an upper perforated stainless steel section and a lower slotted cylindrical section having a slotted floor. The upper and lower sections are joined using an annular channel and toggle clamp assembly for moving the basket by forklift. The upper section includes lifting elements for lifting the basket into and out from a tank or vessel using an overhead gantry crane or a forklift fitted with lifting beams or hooks. The upper basket further includes brackets which are placed on brackets on the upper interior wall of the upper section. When suspended in a fermentation tank, the floor of the fermentation basket is slightly elevated above the floor of the tank.

In its embodiments, the fermentation basket of the present invention simplifies and improves tank fermentation processes. Spoilage from the inadvertent introduction of undesirable microbes can be reduced by effectively eliminating contaminated or dirty must lines, dirty pumps, and by eliminating the use of free run to sluice and the need to introduce and push water through lines from post-fermentation pomace-to-press operations.

The present invention also increases wine production safety by reducing or even eliminating the need to dig out tanks, the need to sluice tanks, and the need to install and remove oak stave devices and staves.

The foregoing advantages include various efficiencies and cost reductions. Less obviously, the need for corresponding labor is also reduced. Not only is there no need to set up and break down pump-over hoses and pumps, but no labor is required for digging out tanks, for sluicing, for installing and removing oak adjunct.

Cost savings are also realized because of the elimination or reduction of several parts and equipment, including access doors on tanks, thermal wells, and D-rings for oak adjunct. Reduced pump motor use also reduces electric power consumption, and chemical costs are reduced because sanitation is not required for must lines, must pumps, transfer hoses, and pumps. Finally, water use is reduced because there is no need to push pomace to the press post-fermentation or to move wine for ullage management.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
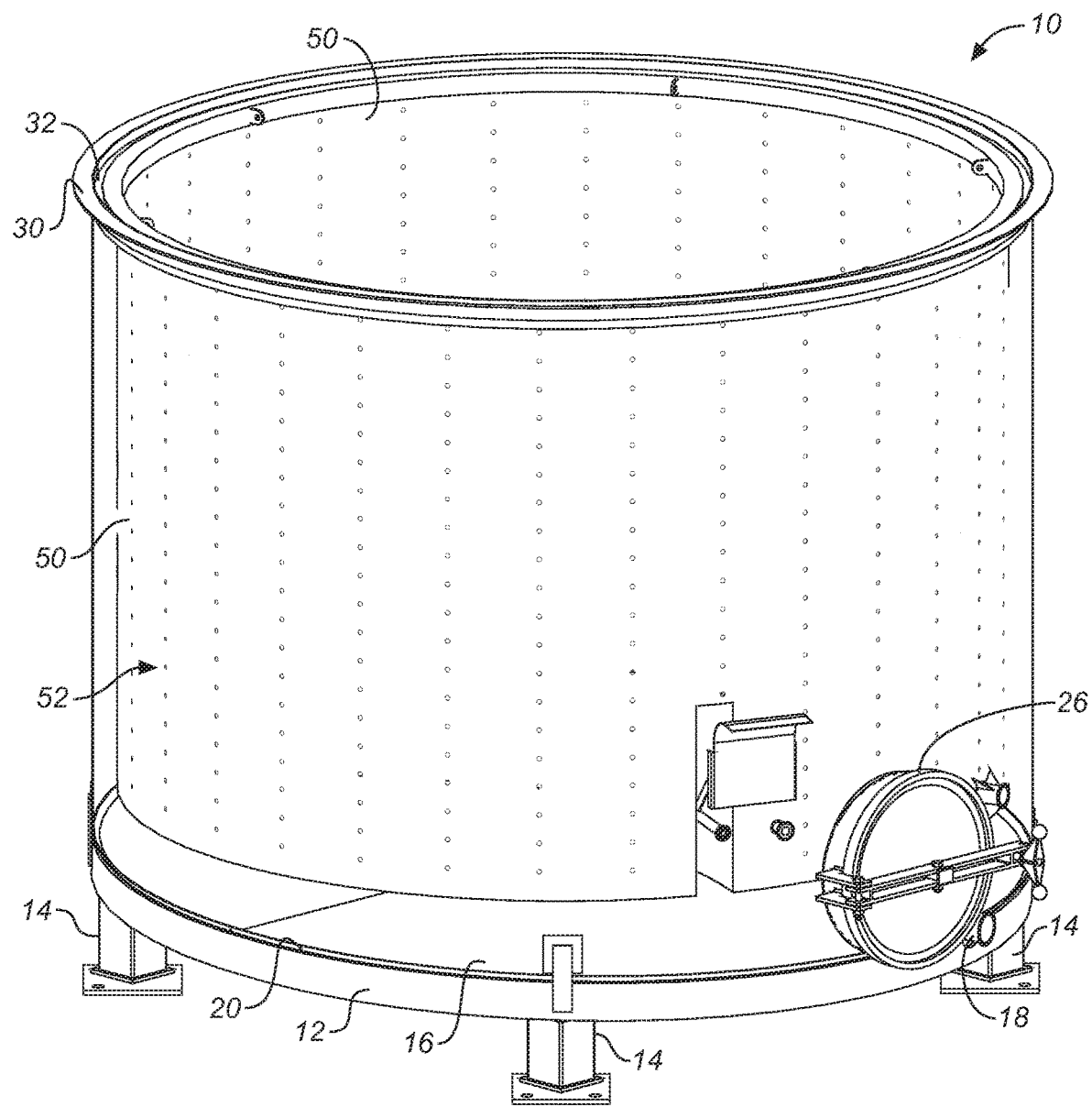
FIG. 1 is an upper front left perspective view of a fermentation tank with a fermentation basket disposed inside, the cylindrical wall of the tank removed to reveal the fermentation basket.

Referring now to FIGS. 1-3C, there is shown a fermentation tank 10 supported on a base 12 comprising a plurality of vertically disposed legs 14. The tank includes a floor 16, preferably a sealed sloping floor which directs fluid content downwardly toward a drain 18 at the front of the tank, as is well-known in the art. The base may be surrounded by a rim 20 of the sloping floor.

Figure 2:
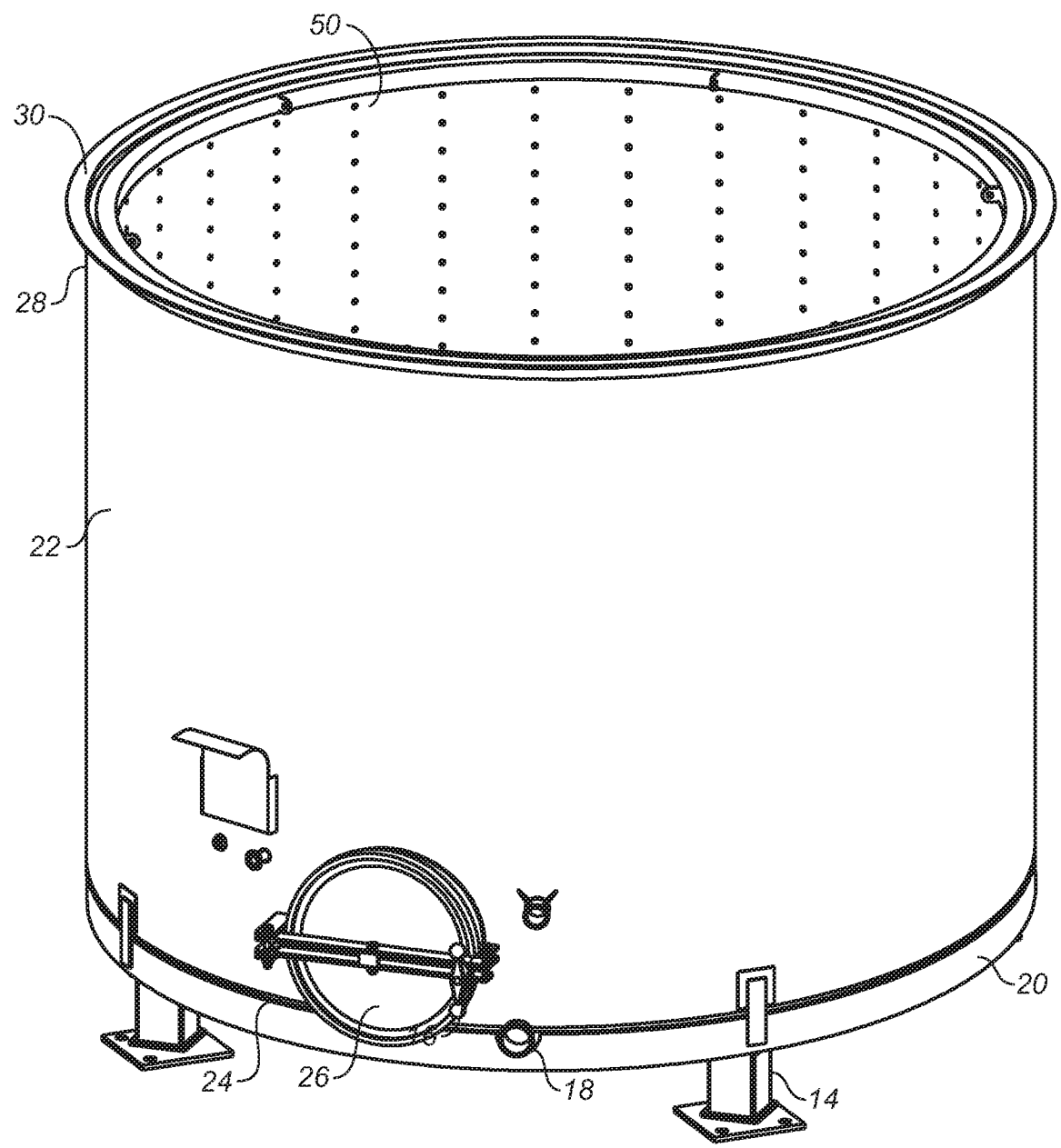
FIG. 2 is an upper right front perspective view of the fermentation basket disposed in the tank.
Figure 3A:
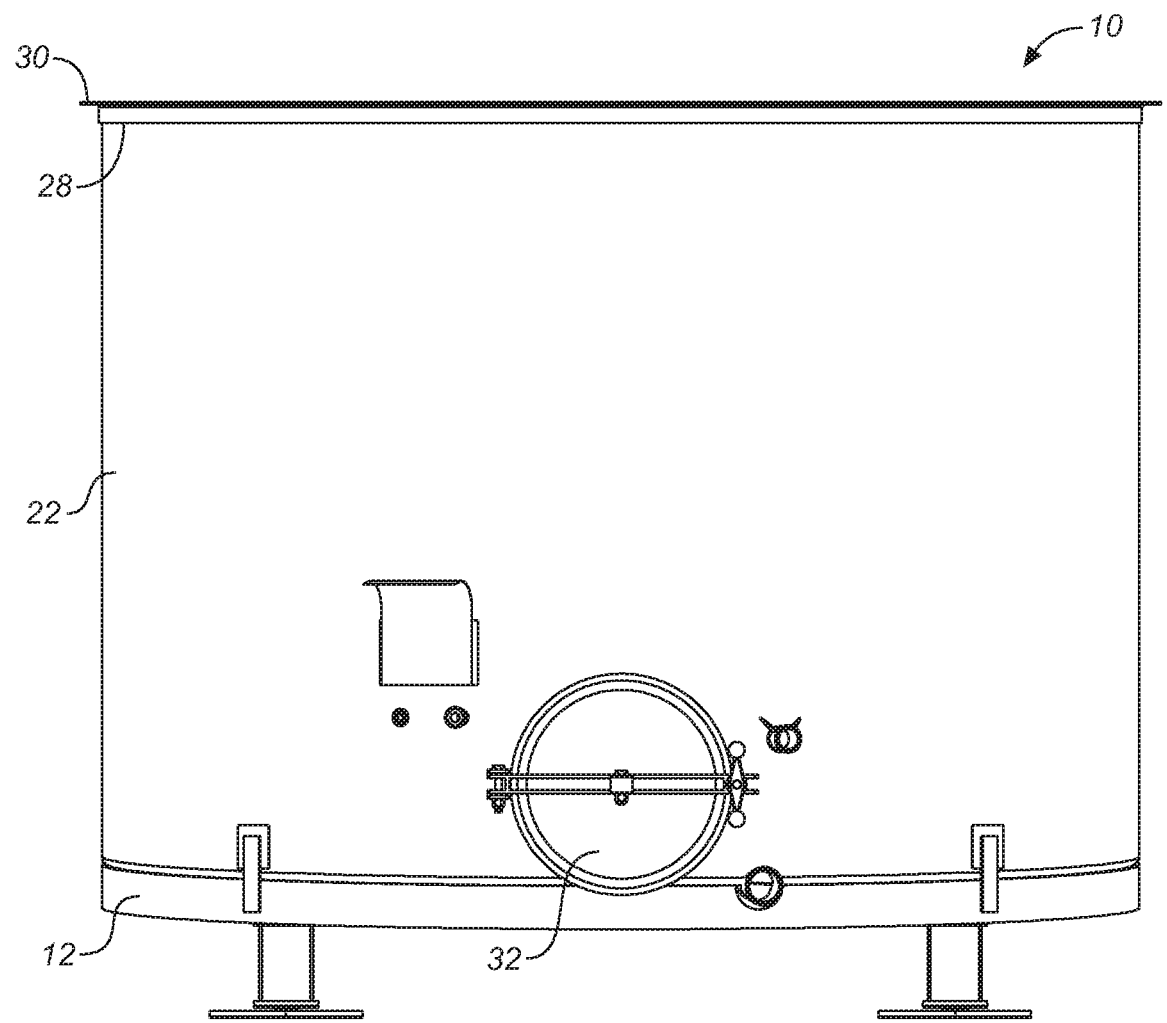
FIG. 3A is a front view in elevation thereof.
Figure 3B:
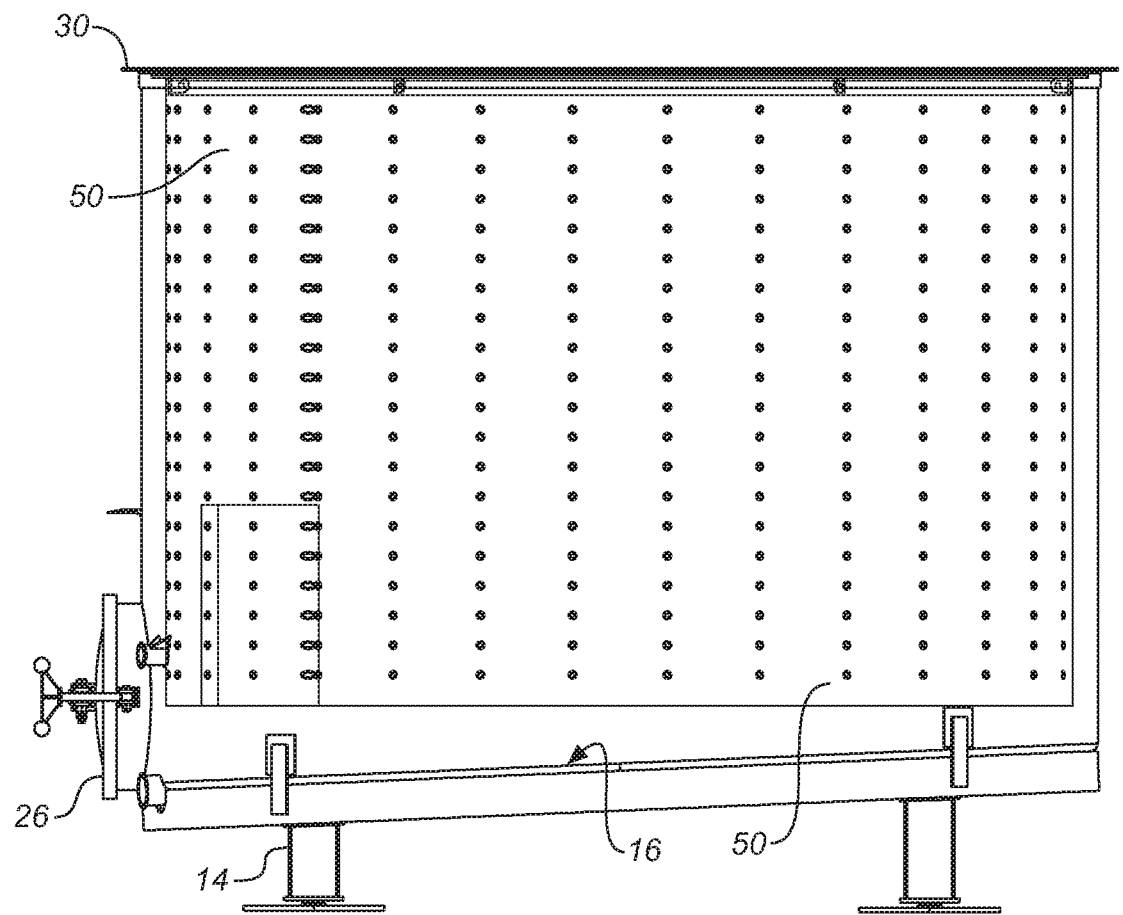
FIG. 3B is a partial side right view in elevation showing the fermentation basket disposed in the tank with a portion of the tank removed to show fermentation basket features.
Figure 3C:
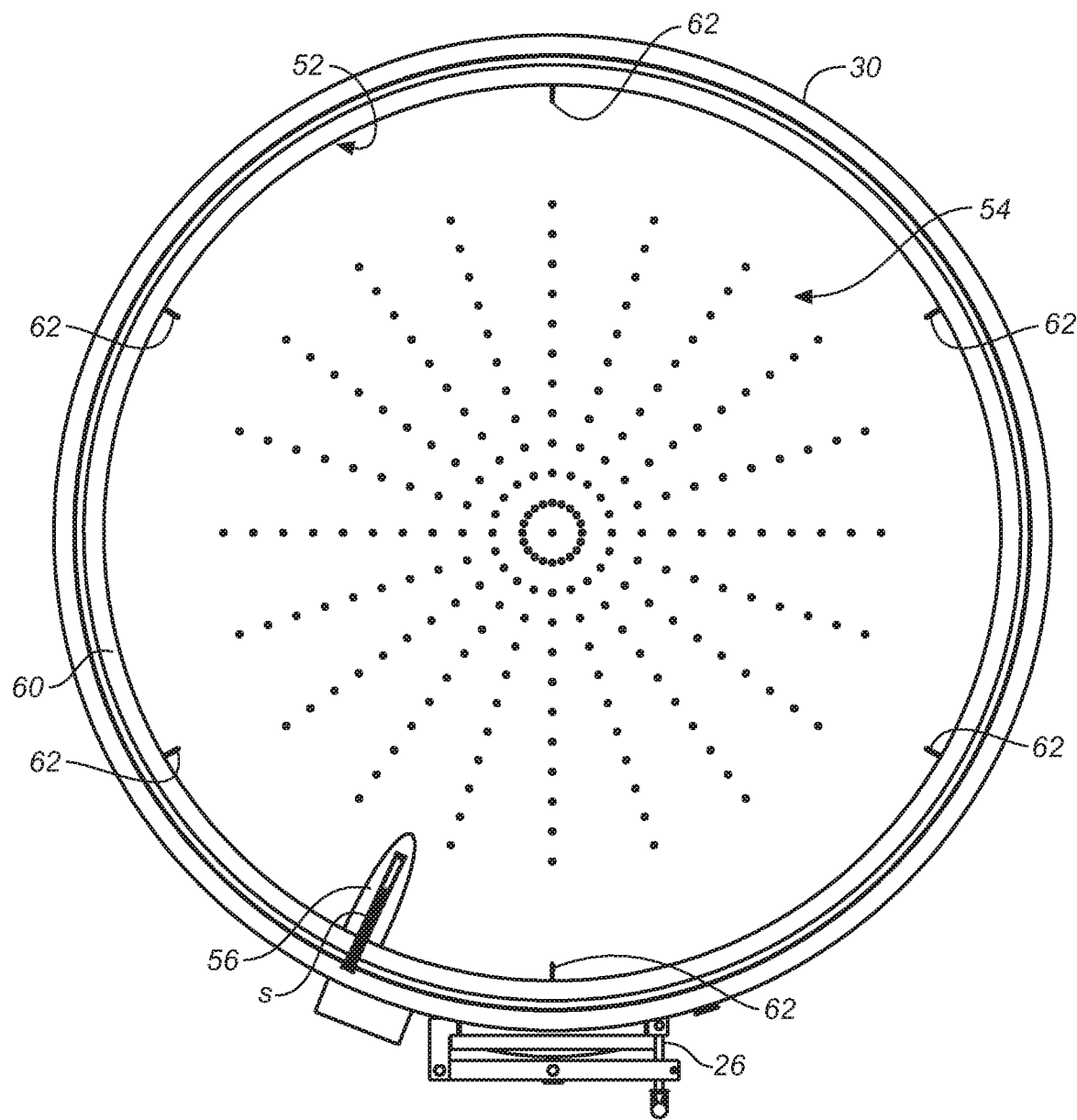
FIG. 3C is a top plan view thereof.

FIGS. 1 and 3B show the tank and fermentation basket 50 without the tank wall included, while FIGS. 2, 3A, and 3C are views including the tank wall (or wrapper) 22. Near the lower edge 24 of the wall 22 is a selectively sealed manway 26 providing for access to the tank interior. The manway cover is coupled to a bracket (or swing arm) and an open-toe clamping assembly with a swing bolt that pivots out of the open toe of the bracket to release the seal on the manway cover and permit it to be opened, all in a manner well known in the art.

In an embodiment, the upper edge 28 of the tank wall 22 may include a circumferential rim 30, angled outwardly. Interiorly, a circumferential angle 32 is welded to the interior side 34 of the tank wrapper.

Figure 4:
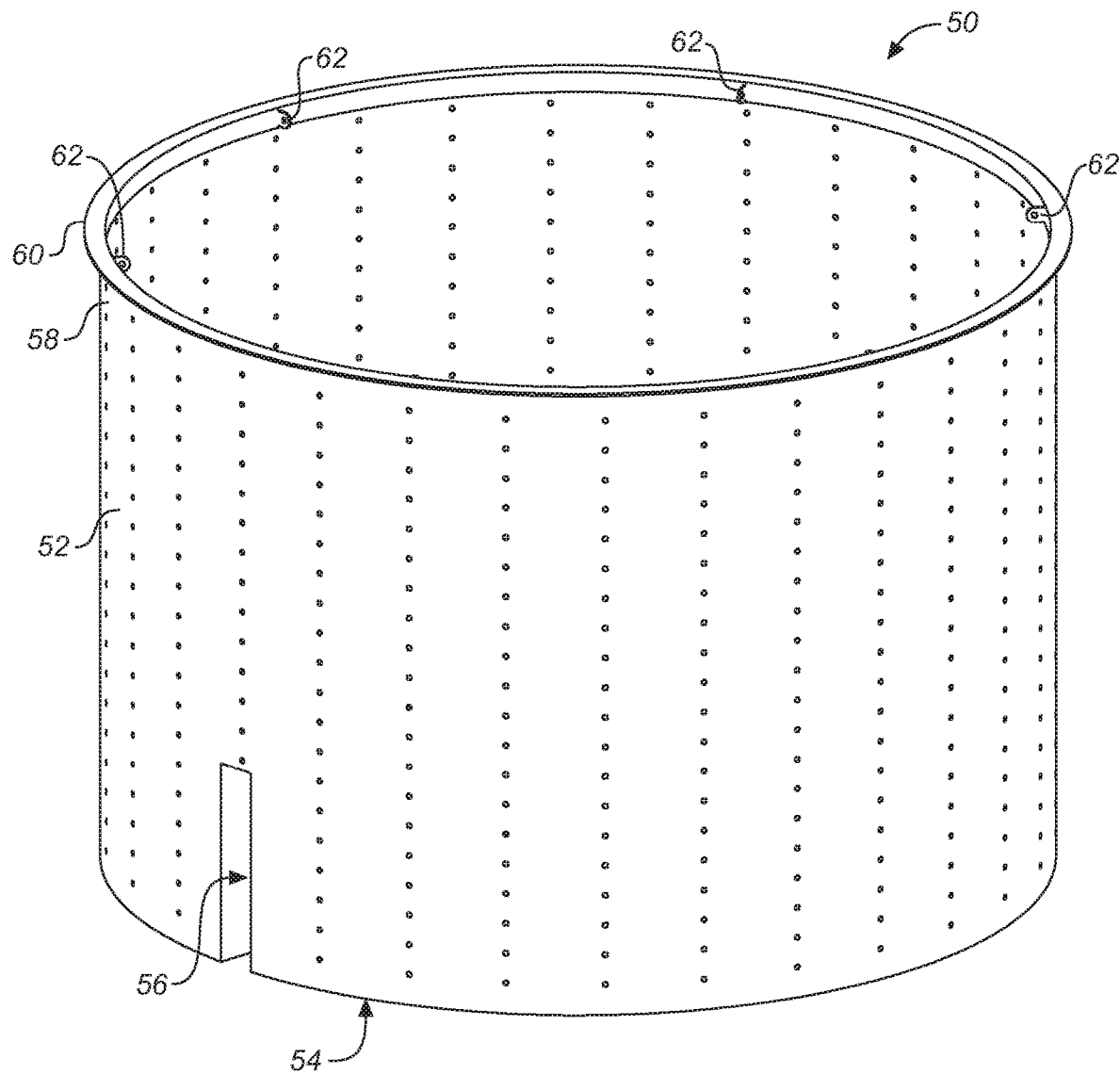
FIG. 4 is an upper front right perspective view of the fermentation basket.
Figure 5:
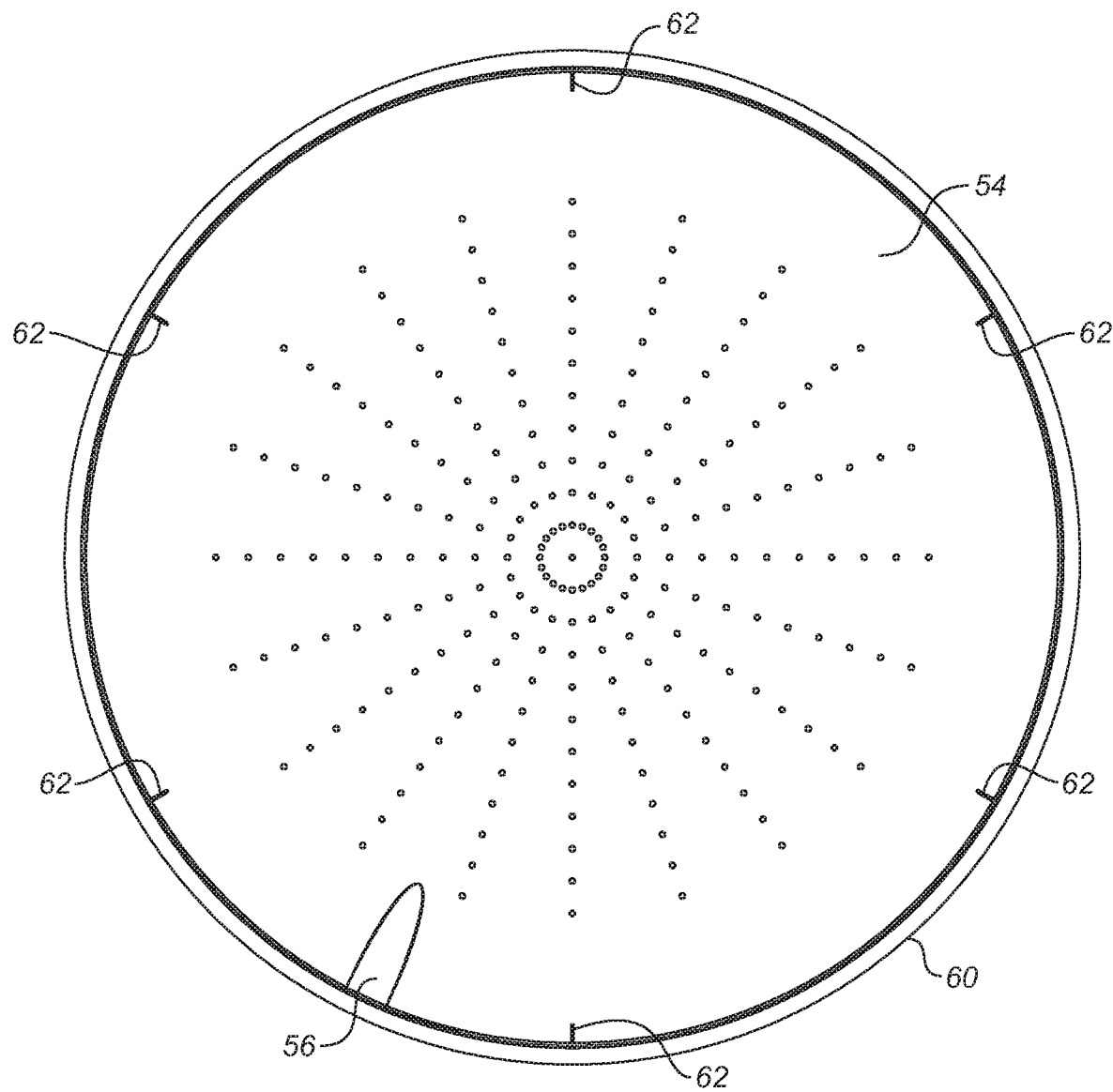
FIG. 5 is a top plan view thereof.
Figure 6:
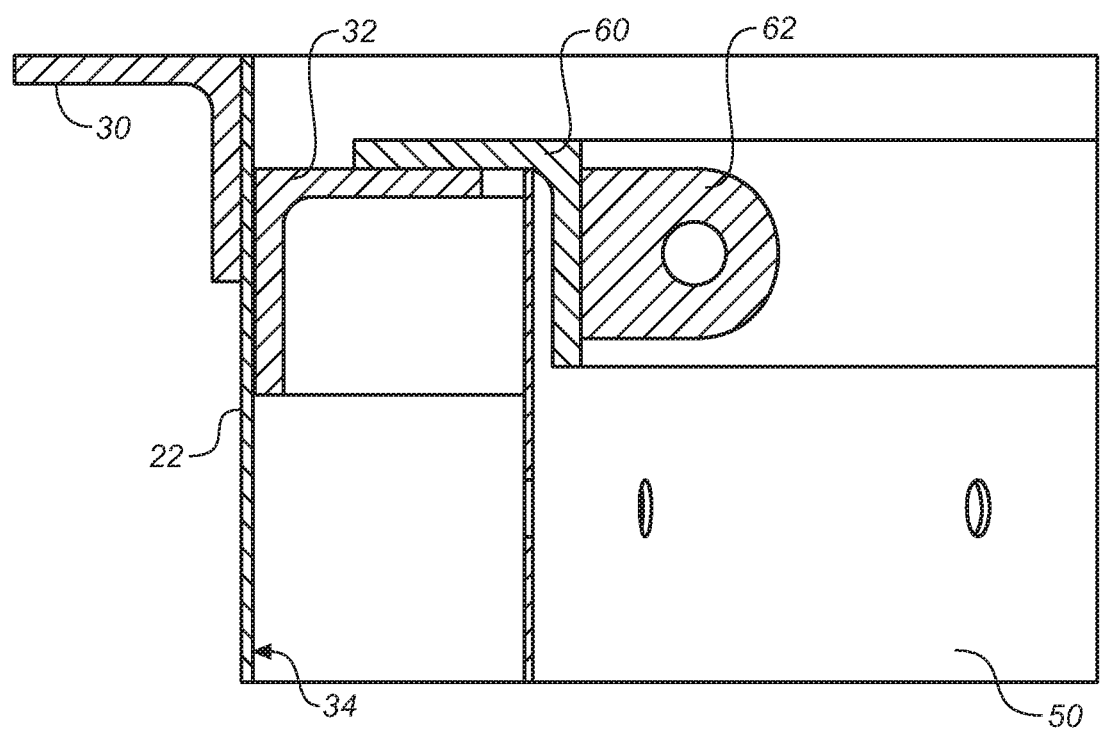
FIG. 6 is a detailed cross-sectional side view in elevation showing the upper portion of the filtration tank and fermentation basket, showing how the welded upper angle of the fermentation basket rests on an interior welded angle on the tank interior.

Still referring to FIGS. 1-3B, and now also referring to next to FIGS. 4-6, it is seen that the fermentation basket 50 includes a perforated cylindrical wall 52 and a perforated bottom side 54. A thermowell 56 is configured in a lower portion of the basket wall to accommodate liquid sensors S for testing wine during production. Near its upper edge 58 is a circumferential angle or rim 60 which is supported by interior circumferential angle 32 on the tank wall. A plurality of evenly spaced lifting tabs 62 welded to or integral with the fermentation basket upper angle 60 enables a wine producer to lift and entirely remove the basket from the tank during racking. Solids of any size exceeding the perforation size will thereby be removed from the remaining juice/wine.

In another embodiment, and referring now to FIGS. 7-15, the fermentation basket 100 includes a 12 gauge stainless steel upper cylindrical section 102 and a heavier 7 gauge stainless steel lower cylindrical section 104, the former having circumferential apertures 106, preferably perforations or holes and the latter having circumferential vertical slots 108. In an embodiment, the upper section is approximately 20 inches in height, while the lower section is 42 inches in height. The sections have a matching outer diameter, which in an embodiment is 67 inches.

Figure 12:
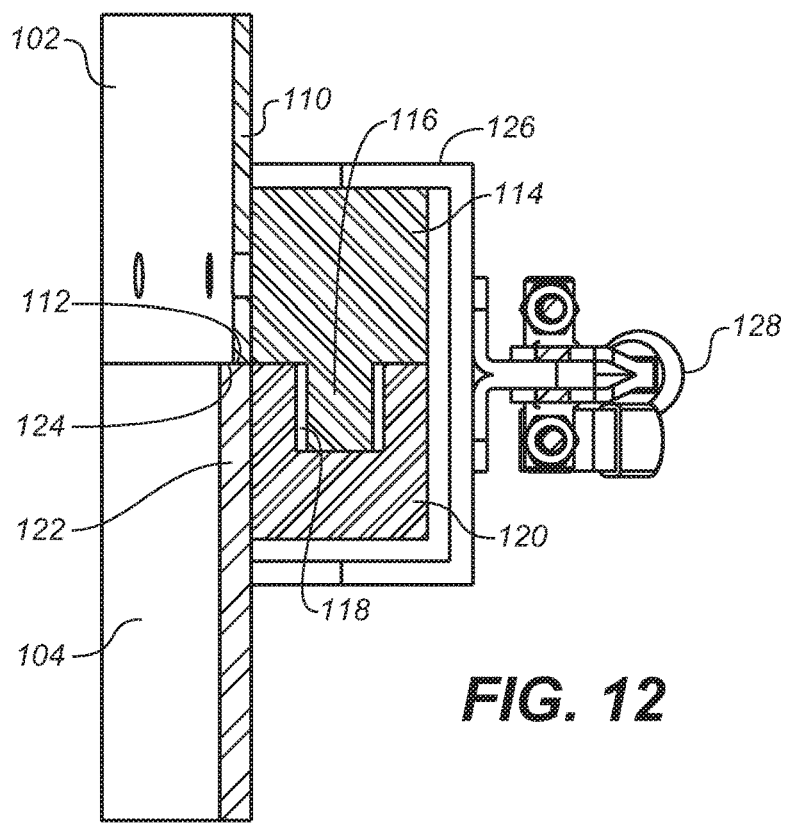
FIG. 12 is a detailed cross-sectional view showing the U-channel and toggle clamp assembly by which the upper section and lower section of the fermentation basket are coupled.
Figure 13:
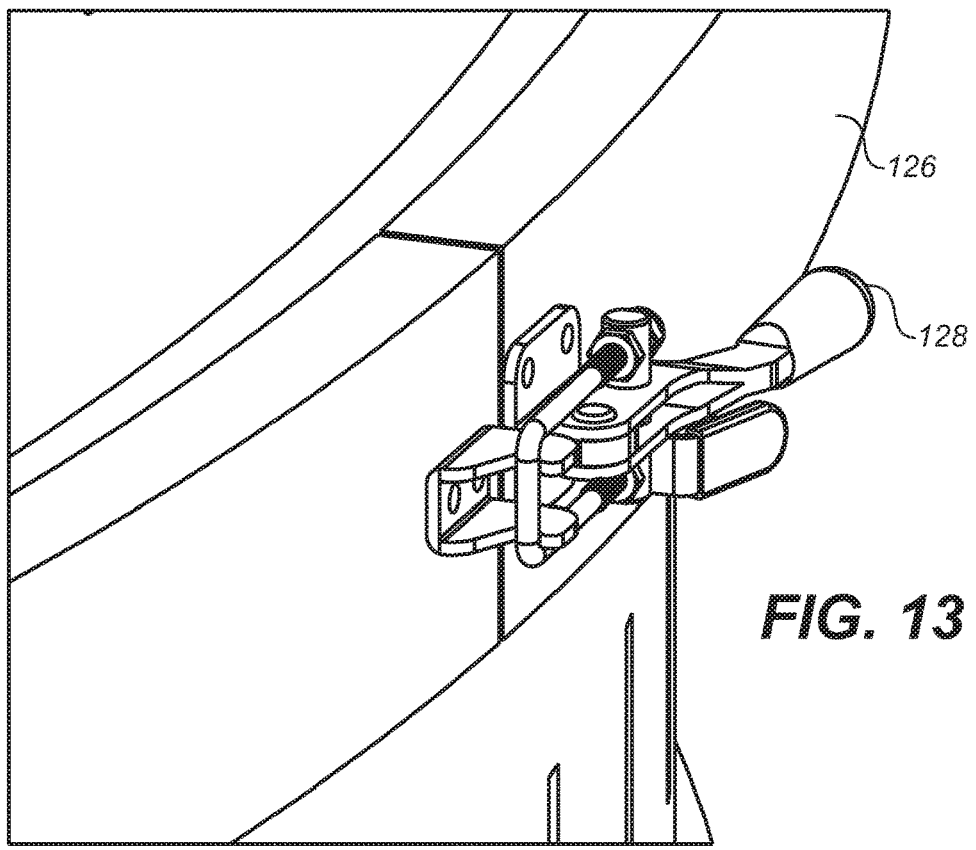
FIG. 13 is a detailed upper perspective view thereof.
Figure 14:
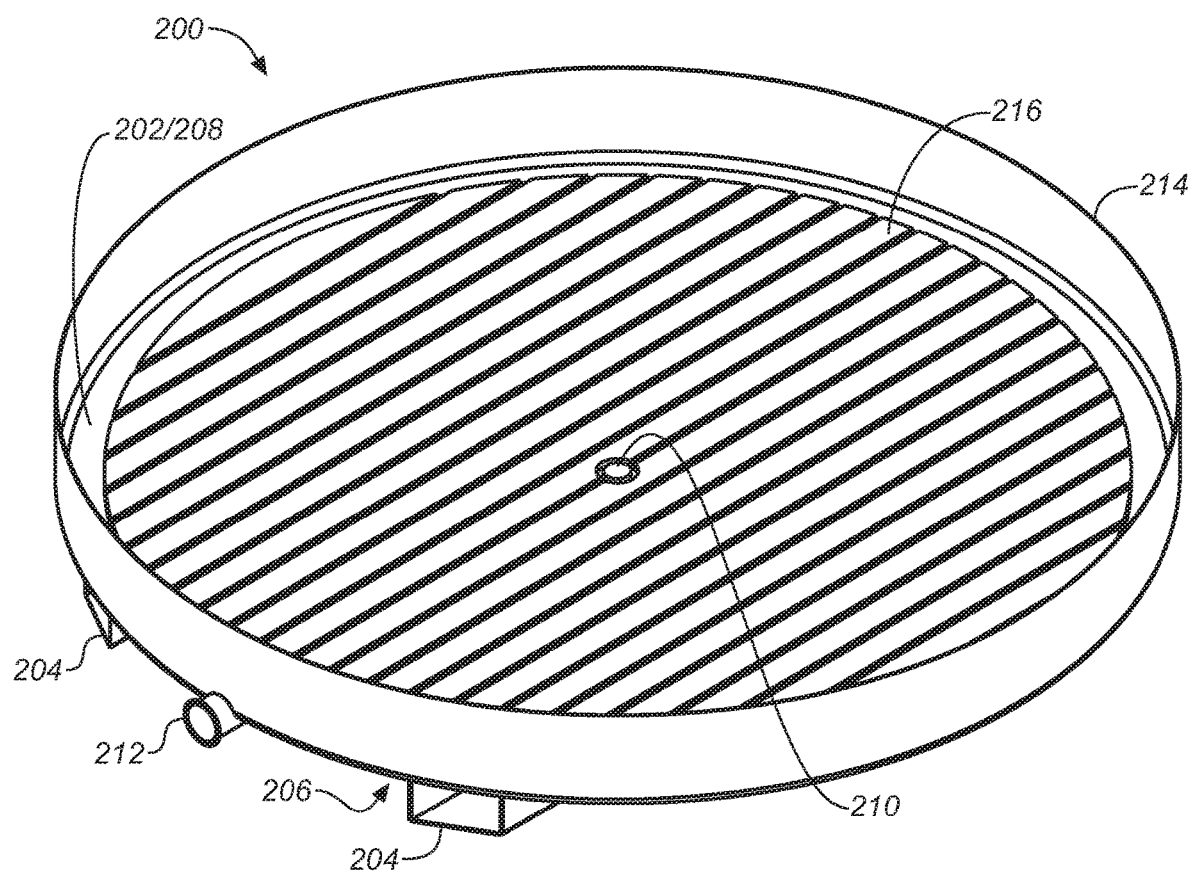
FIG. 14 is an upper front perspective view of the storage pan onto which the fermentation basket may be disposed when removed from a fermentation tank.

FIGS. 12-13 show that circumferentially surrounding a lower portion 110 of the upper section 102 extending to its lower edge 112 is an upper section coupling flange 114 comprising square bar having a male tongue 116 which matingly inserts into a complementary groove 118 disposed in a lower section coupling flange 120 comprising rolled steel bar circumferentially surrounding an upper portion 122 of the lower section 104 up to its upper edge 124. When the upper basket section is placed atop the lower section so that the flanges are matingly joined, an annular stainless steel U-channel coupling ring 126 with a toggle clamp 128 is placed around the flanges and employed to secure the couple and enable lifting, forklift transport, and suspension in a fermentation tank.

The lower section 104 includes upper and lower pairs of fork pockets 130, 132, on opposing sides of the basket for handling by a forklift. The fork pockets are generally rectangular or square in cross section, approximately 6 inches in height and 18 inches in length, and formed from ⅜ inch steel plate. For structural integrity, the areas of the lower section of the basket under and bordering the fork pockets lack any kind of opening (holes, slots, perforations, etc.) that would weaken the basket such that it would not bear the anticipated loads when lifted by a forklift.

Welded to the lower section is a basket floor 134, matching the sheet metal thickness of the lower section, and having slots 146 generally conforming in size and configured similarly to those on the bottom section. On the underside 148 of the basket floor, a plurality of ½ inch steel tubes 150 are radially arrayed to form a standoff platform for placement on a floor or in a drain pan.

On the upper edge of the basket, capping the upper section, is a circumferentially disposed rolled steel square bar 152 and a plurality of evenly-spaced hanging hooks 154. The hanging hooks are employed to suspend the fermentation basket in a tank by lowering the basket into a tank 180 having spaced hanging brackets 182 disposed on the interior side 184 of the tank wall 186. The hanging hooks are formed from steel plate, preferably at least ¾ inch in thickness, and include a downwardly curving outboard end 156, the curvature providing a channel 158. The hanging brackets are welded to the exterior side 160 of the upper section 102 with a stainless steel backup pad 162 disposed between the hanging hook exterior side of the basket. Each hanging bracket includes two spaced-apart projections 188a, 188b, having a hanging rod 190 extending between the projections. The rod fits into the hanging hook channel 158.

Figure 7:
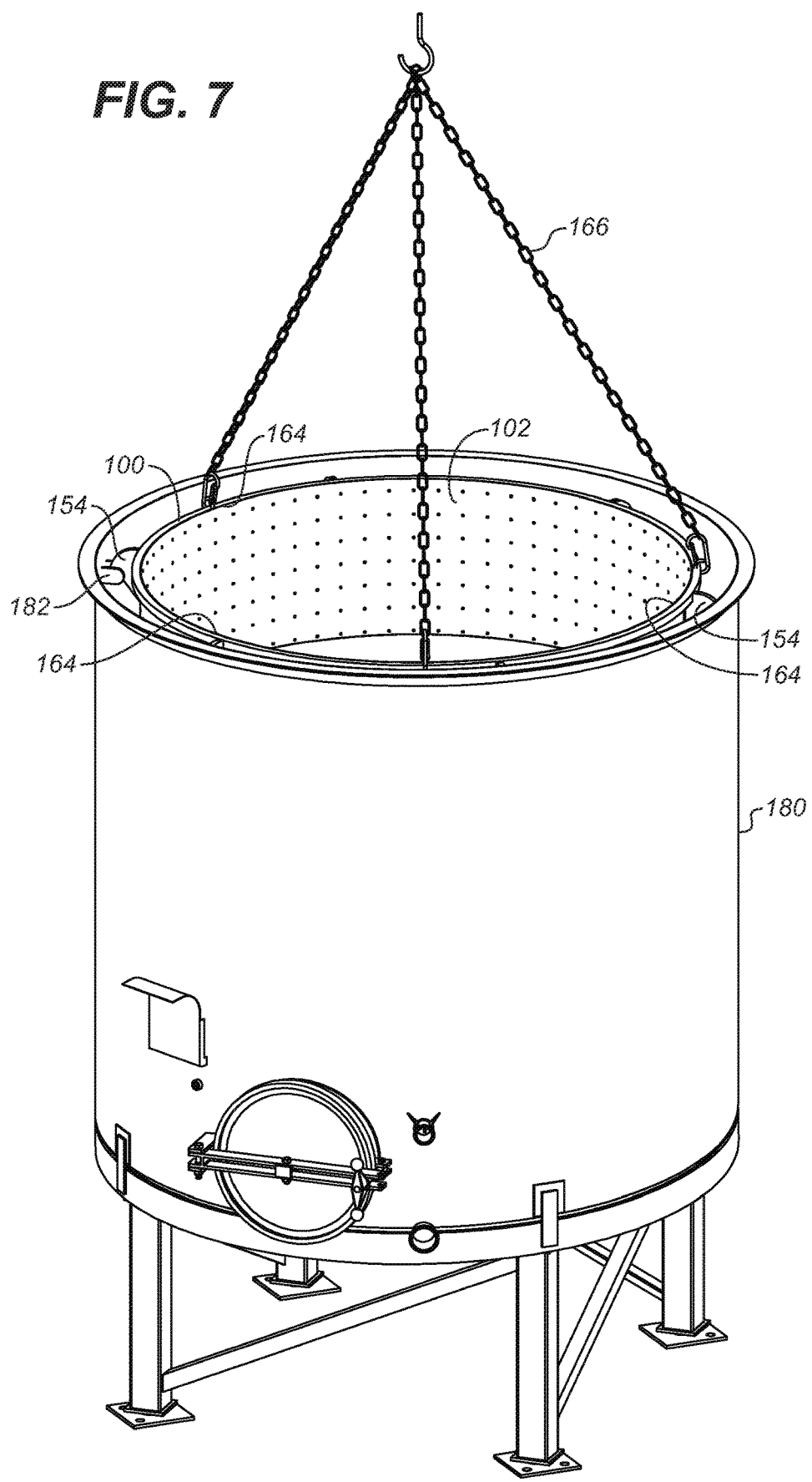
FIG. 7 is an upper perspective view of a second embodiment of the fermentation basket of the present invention, shown being lowered by lift for installation and suspension in a fermentation tank.
Figure 8A:
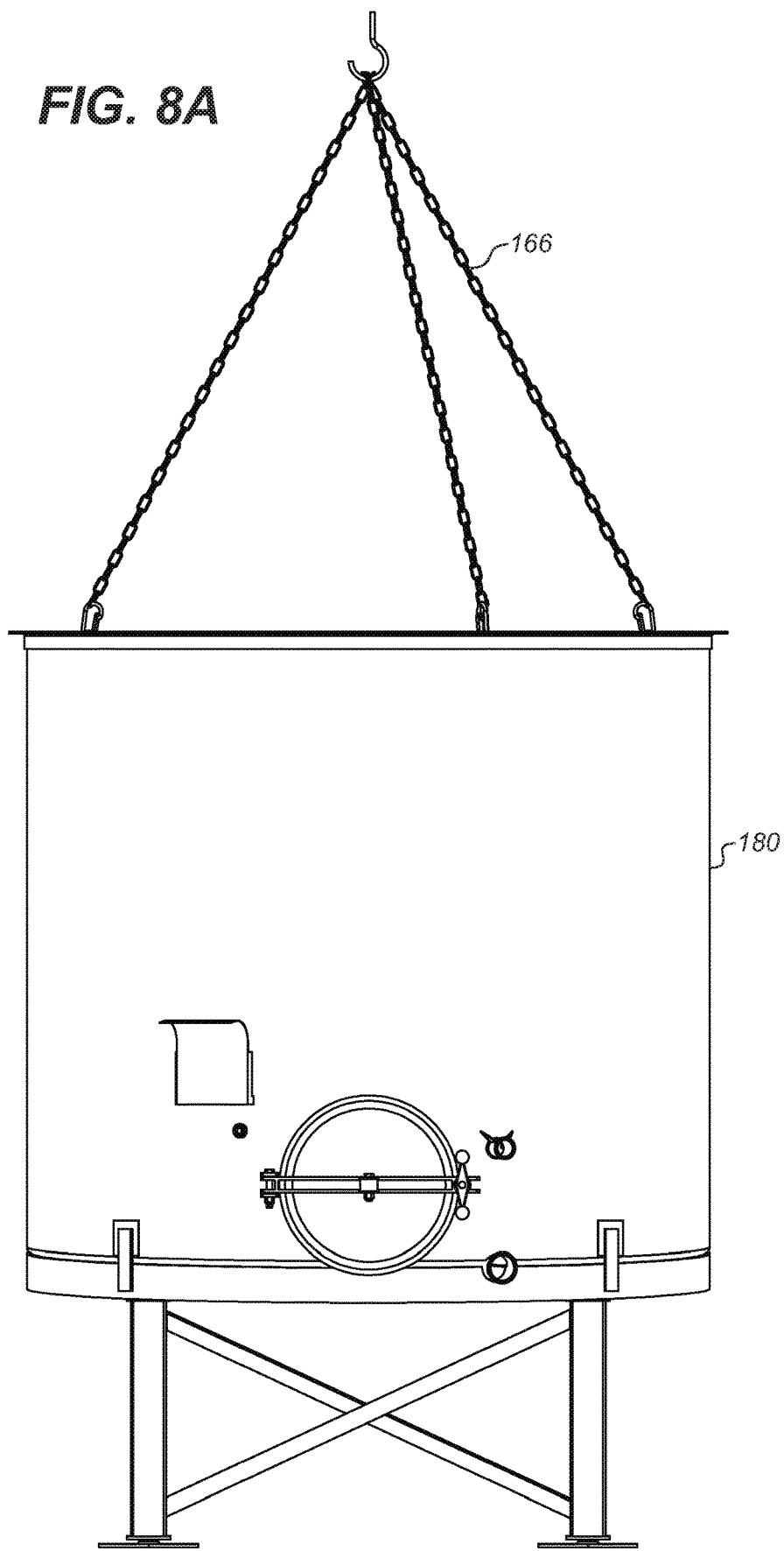
FIG. 8A is a front view in elevation thereof.
Figure 8B:
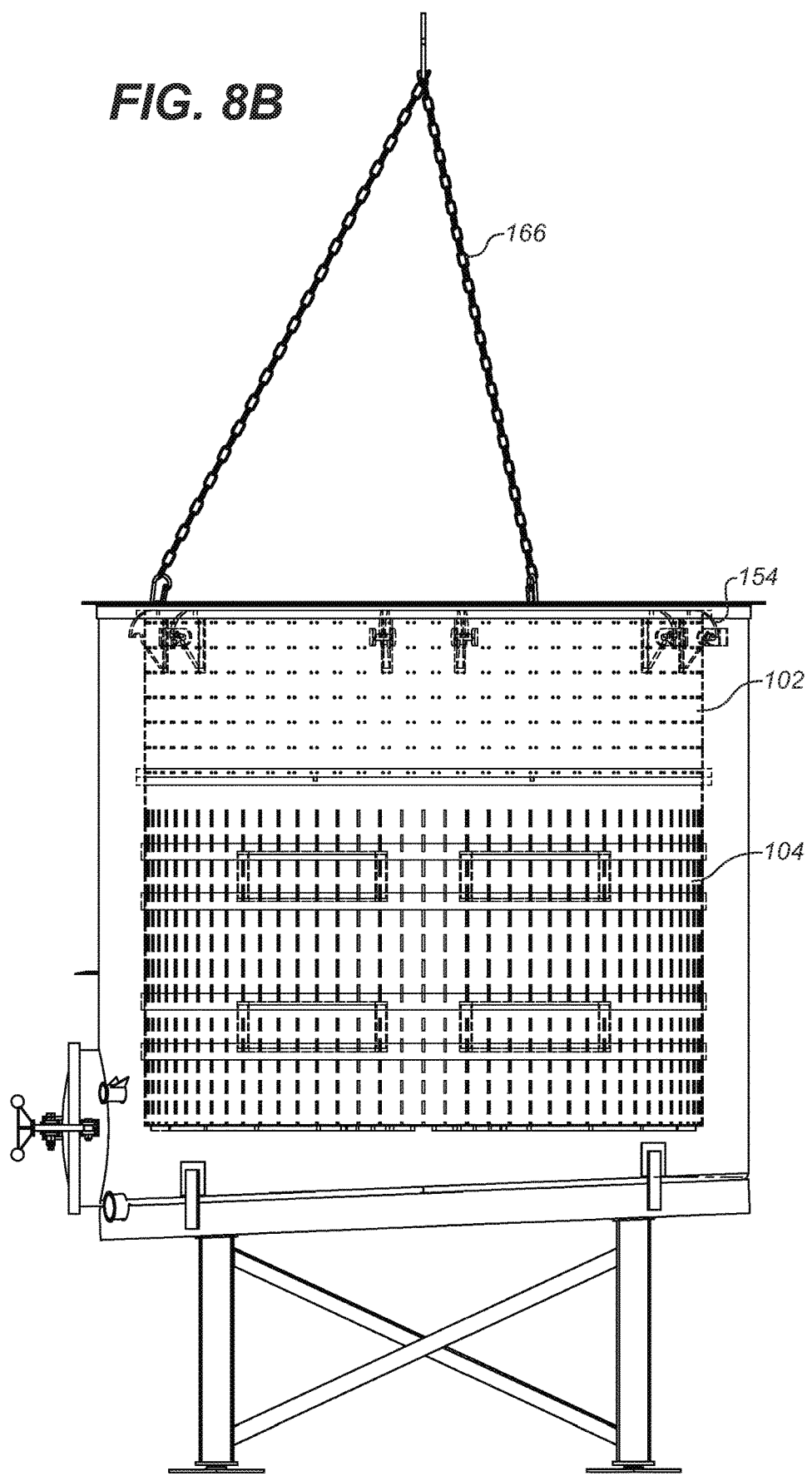
FIG. 8B is a cross-sectional side view in elevation thereof.
Figure 8C:
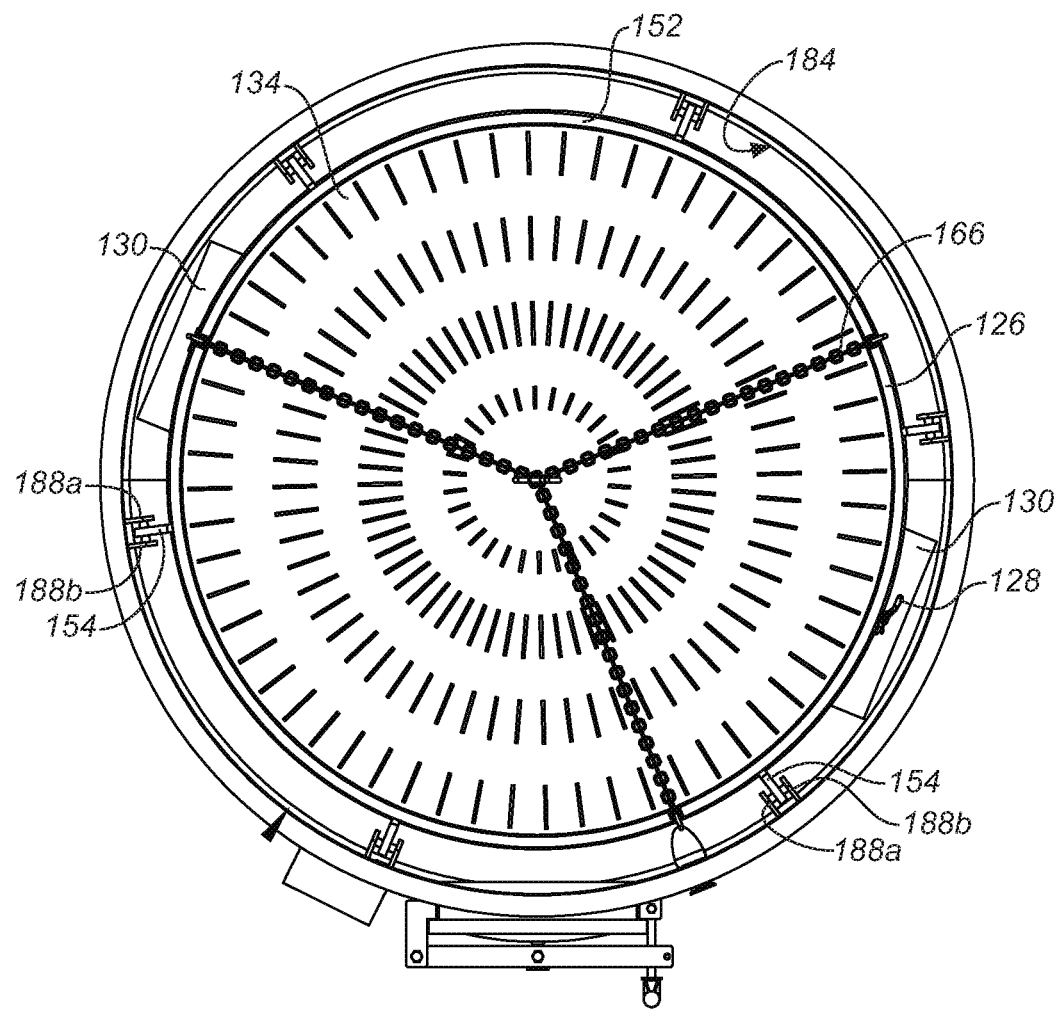
FIG. 8C is a top plan view thereof.
Figure 9:
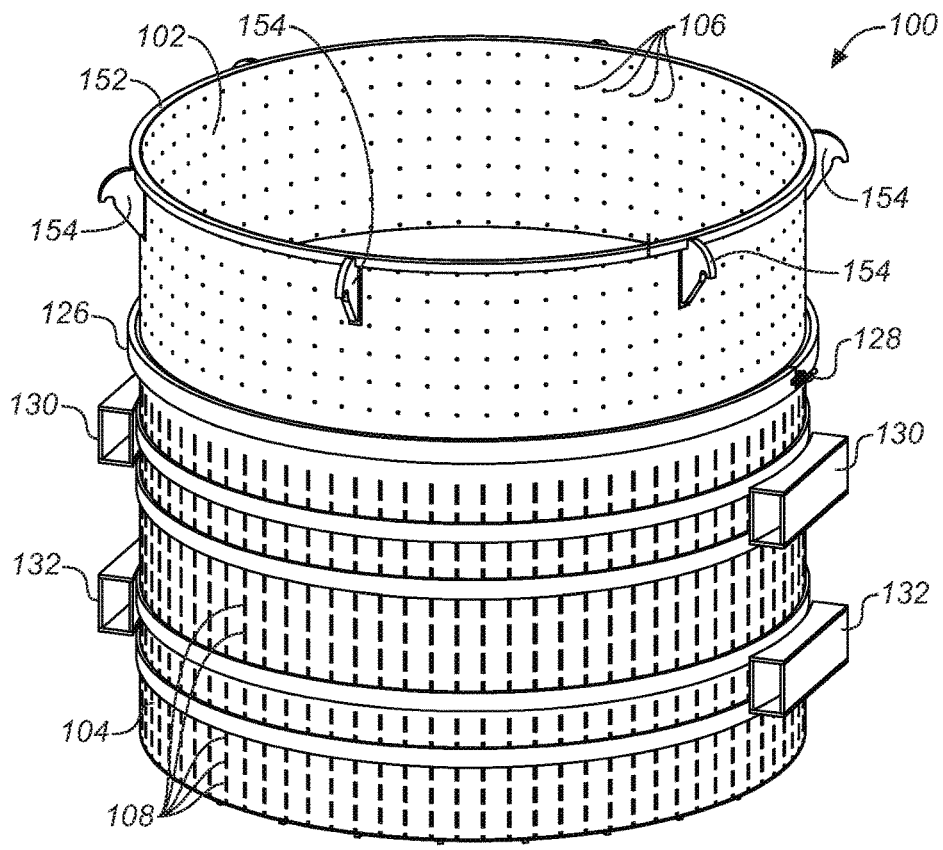
FIG. 9 is an upper front perspective view showing the second embodiment of the fermentation basket removed from the fermentation tank and standing alone.
Figure 10A:
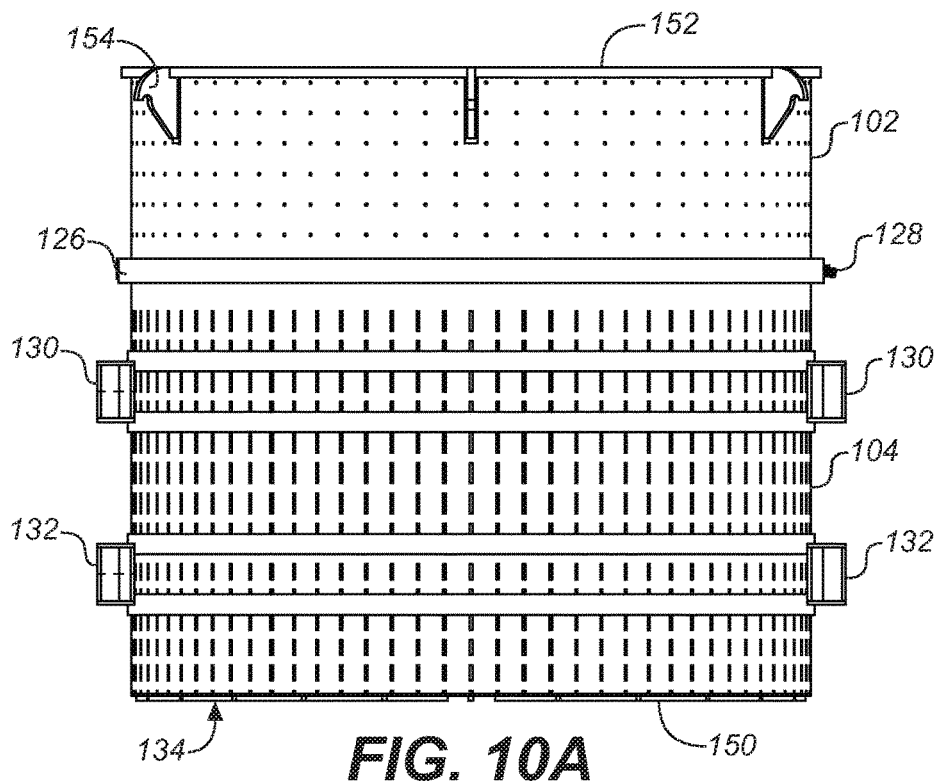
FIG. 10A is a front view in elevation thereof.
Figure 10B:
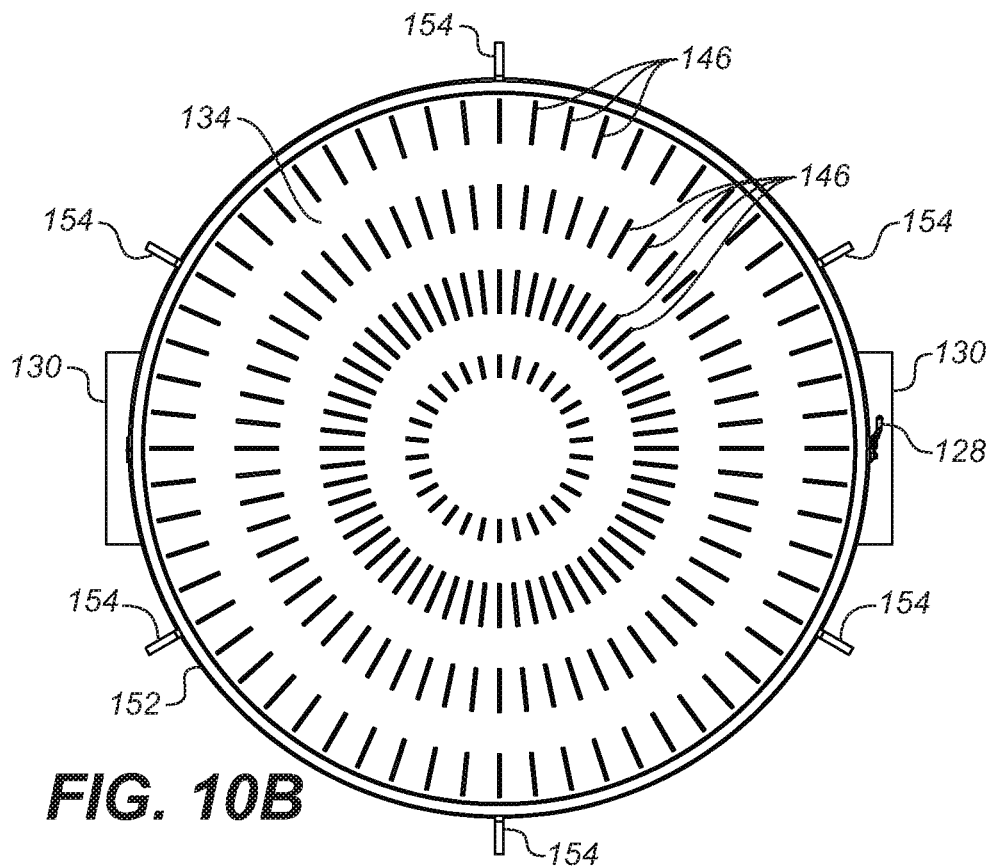
FIG. 10B is a top plan view thereof.
Figure 10C:
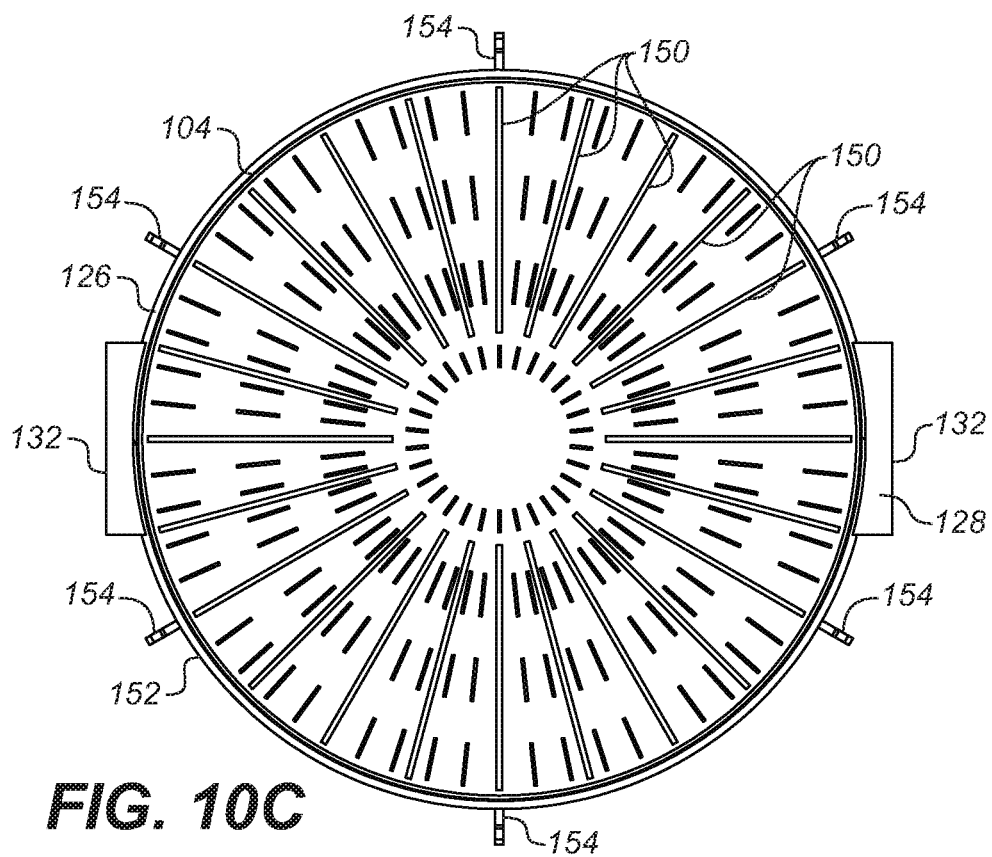
FIG. 10C is a bottom plan view thereof.
Figure 11:
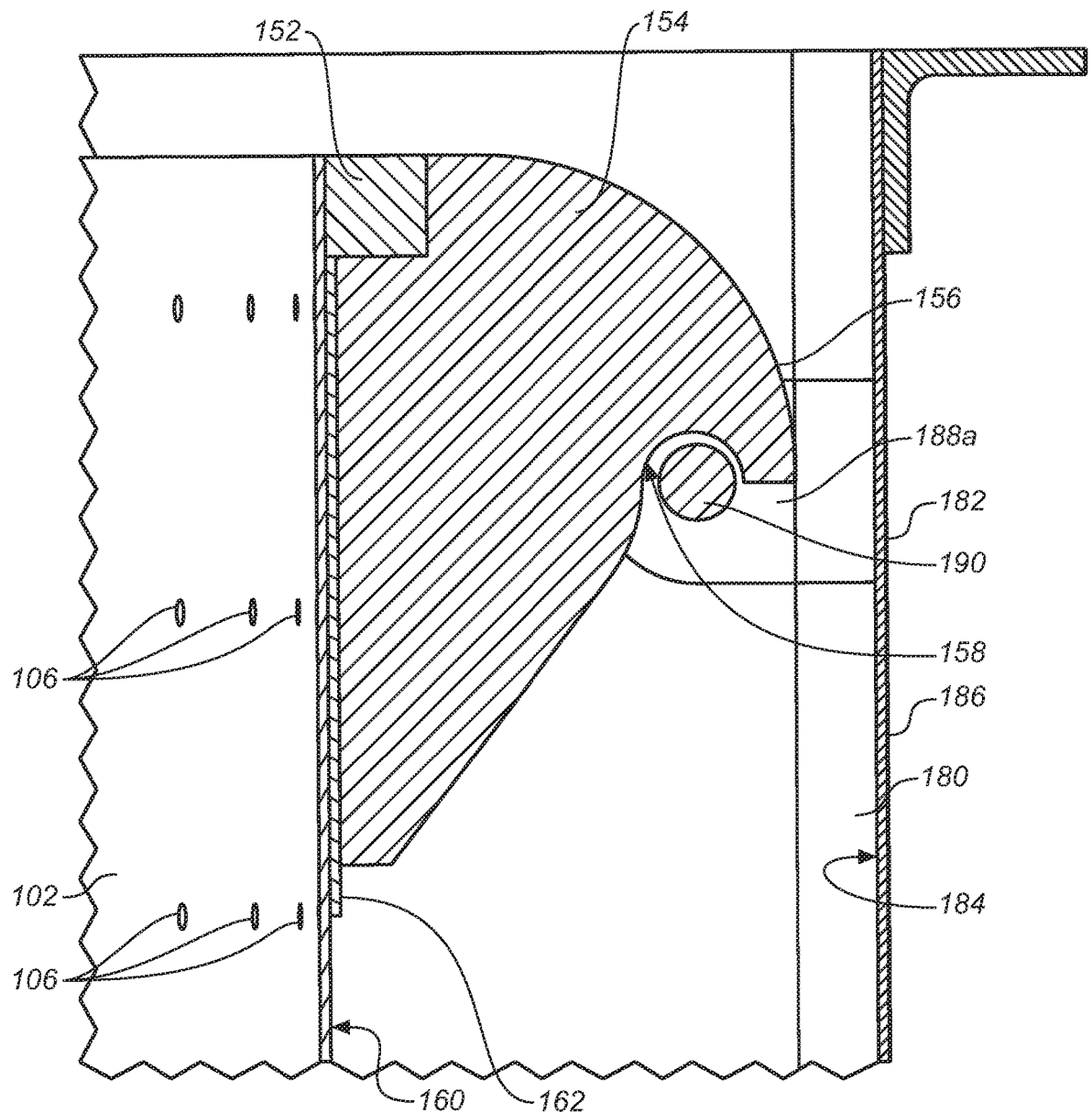
FIG. 11 is a detailed cross-sectional view showing the basket support and hanging bracket by which the fermentation basket is suspended within a fermentation tank.

Referring next to FIGS. 7-8C, it can be seen that the fermentation basket includes connecting holes 164 for attaching a cable or chain 166 for use with a lift or crane to lower the fermentation basket into a tank and to remove it thereafter. When so removed, particularly when removed from an active fermentation tank, the fermentation basket may be placed onto and stored on well-known type of basket drain pan 200 [see FIG. 14, prior art]. The pan includes a base 202 with fork pockets 204 on the underside 206. The base upper side 208 is concave to form a sink with a drain hole 210 in the center. The drain hole drains out the side of the pan at a drain outlet 212. A perimeter skirt 214 contains fluids for draining. A large plastic or nylon insert 216 provides a flat platform on which the fermentation basket rests.

Figure 15:
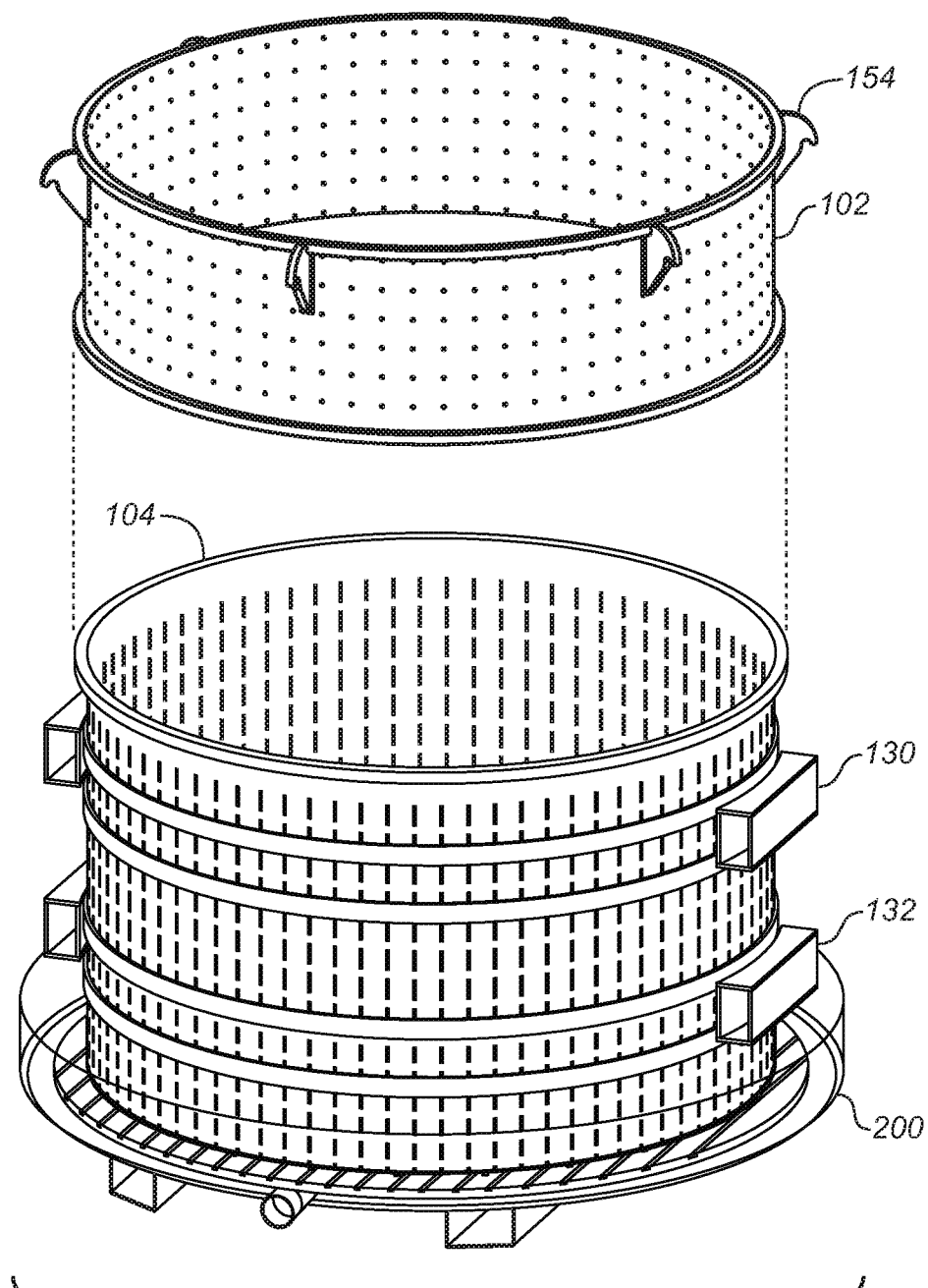
FIG. 15 is an upper front perspective view showing the upper and lower sections of the fermentation basket uncoupled.

FIG. 15 shows how the upper portion 102 and lower portion 104 may be separated for cellar operations, including pressing off juice remaining in grape pomace or sediment. The lower portion is transported to a screw press, and pressing takes place directly in the fermentation basket, with no need to transfer solids from the fermentation basked into a separate press container.

Figure 16A:
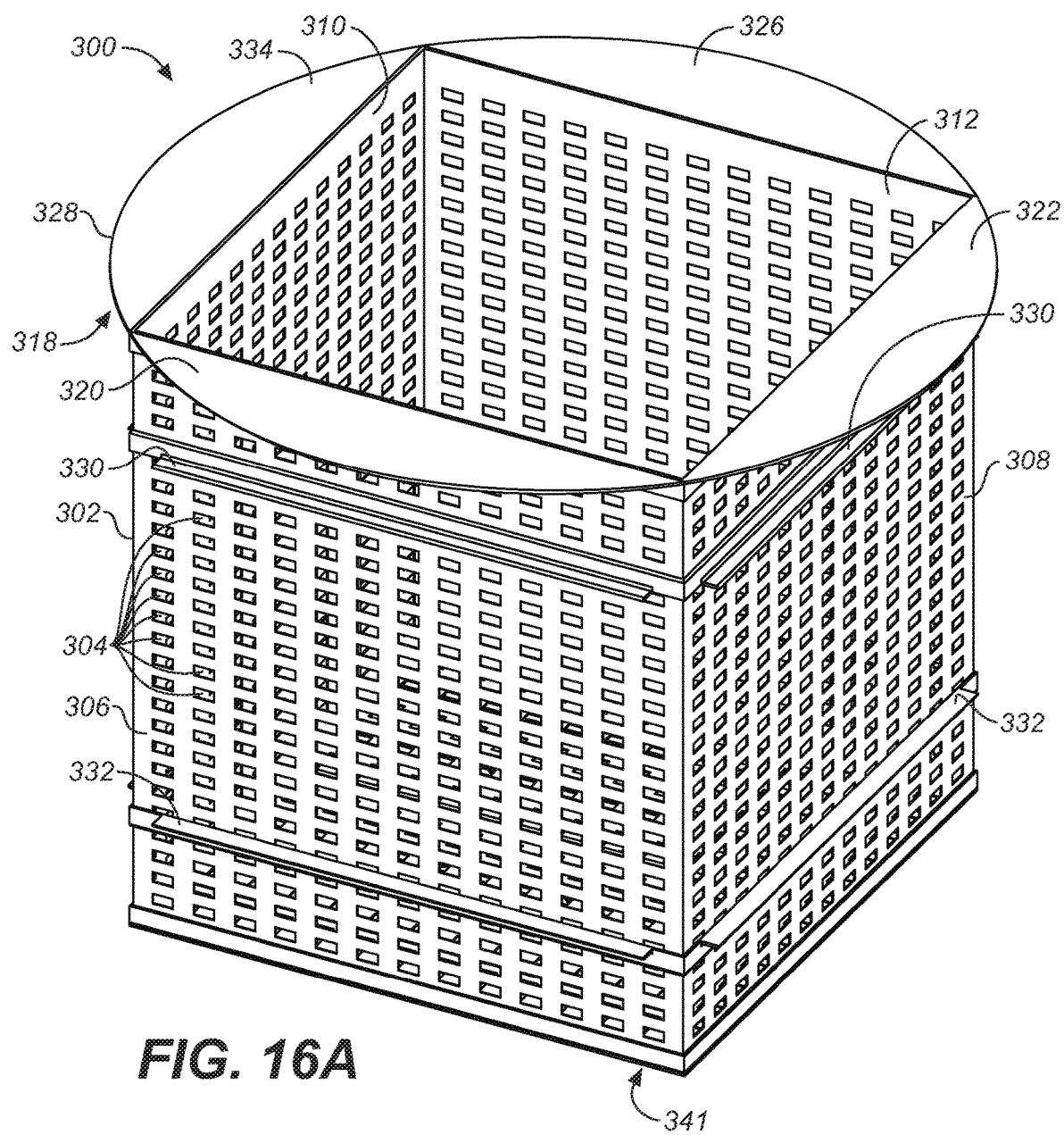
FIG. 16A is an upper perspective view showing an alternative geometry of the filtration basket, in this instance having a cuboid shape to match that of either a cylindrical fermentation tank or a similarly shaped fermentation tank.
Figure 16B:
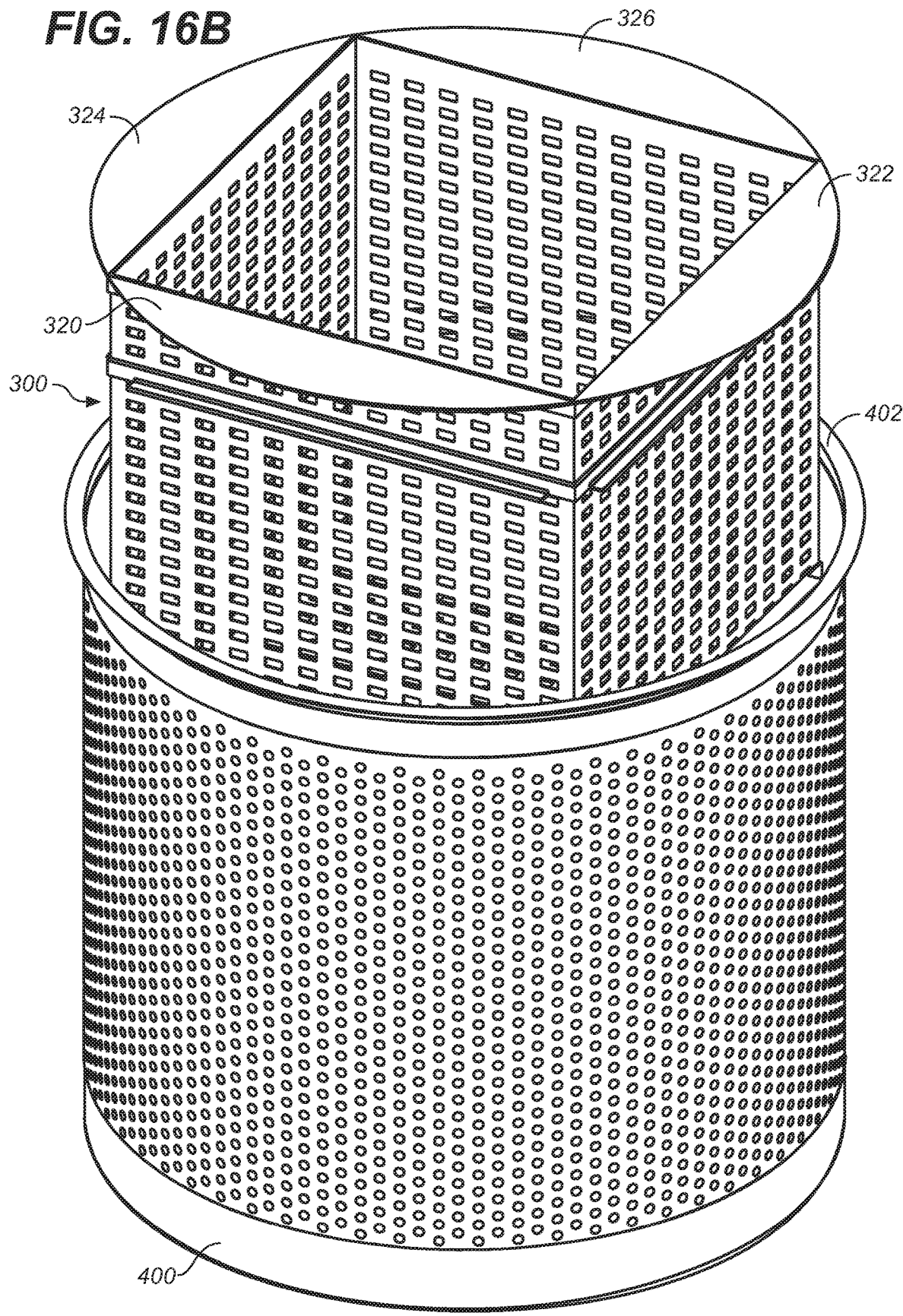
FIG. 16B is the same view showing the fermentation basket partially inserted (lowered) into a cylindrical fermentation tank.

FIGS. 16A-16B show an alternative embodiment 300 of the fermentation basket of the present invention. In these views there is shown a generally cuboid (i.e., having a generally square or rectangular open top, closed bottom, and square or rectangular sides).

As in the cylindrical iterations of the inventive fermentation basket, this embodiment 300 is preferably fabricated from stainless steel and includes a generally singular cuboid body 302 and includes rows and columns of apertures 304, on each of its four vertical walls or sides 306, 308, 310, 312, as well as on its bottom side 314. The apertures may be holes, slots, or rectangular or square openings.

FIGS. 16A-16B show that the upper rim 316 of the body 302 includes a circumferential or perimeter flange 318 comprising four equally sized circle segments 320, 322, 324, 326, which may be welded normal to the sides or may comprise bends in each of the sides. The segments form a continuous annular edge 328. When the filtration basket is lowered into a fermentation tank (e.g., a cylindrical tank 400), the flange rests atop the upper rim 402 of the fermentation tank or an interior flange or rim to support the basket in the tank such that the bottom side of the filtration basket is suspended above the bottom of the fermentation tank. The segments also provide structure under which the forks of a forklift may be disposed for hoisting the filtration basket out of the fermentation tank. Upper and lower structural ribs 330, 332 disposed on the basket sides prevent bowing of the walls under interior loads.

Figure 17:
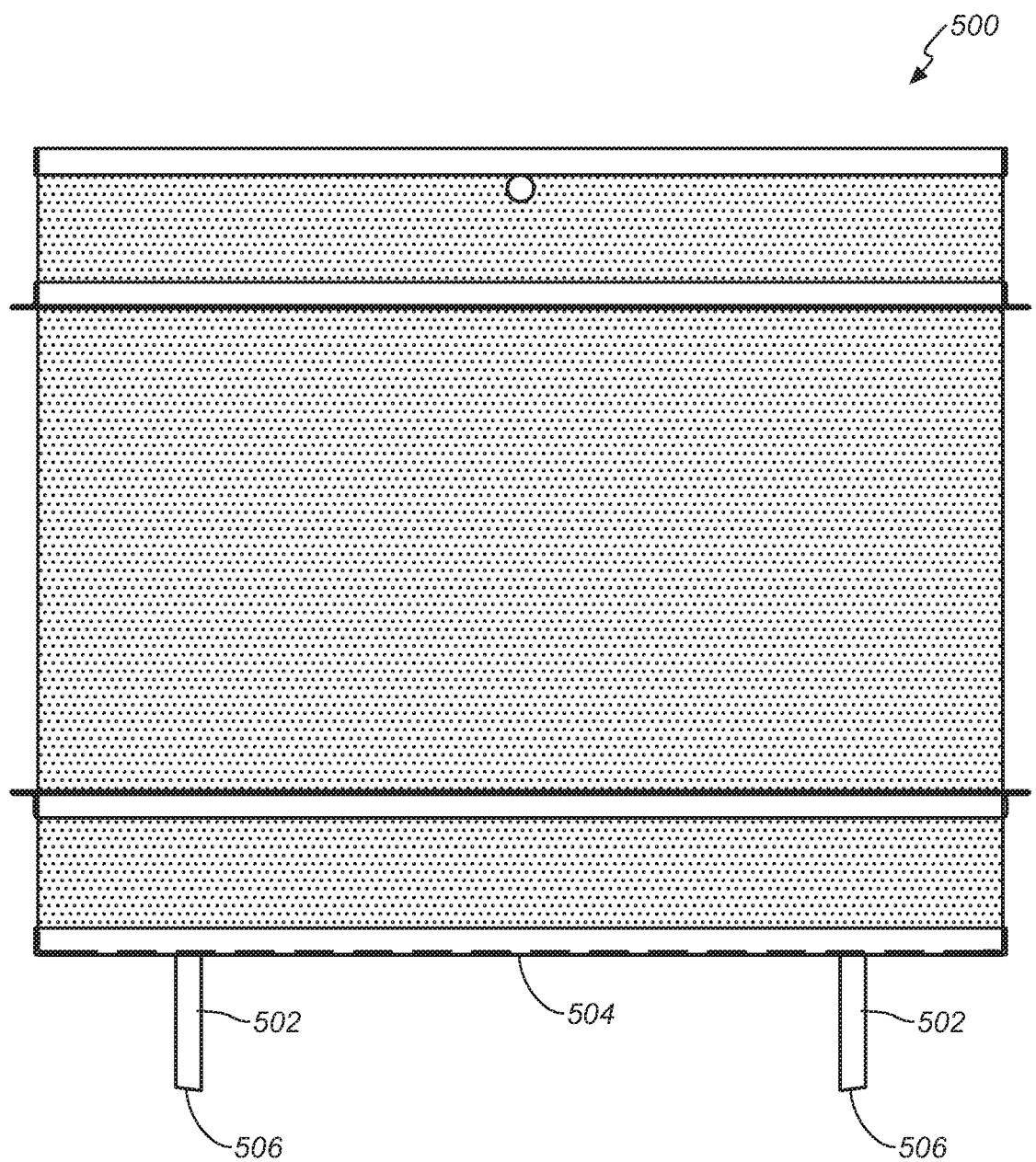
FIG. 17 is a side view in elevation of an alternative embodiment of the inventive filtration basket, showing legs installed on the bottom so as to support the basket within a fermentation tank.

In still another embodiment, shown in FIG. 17, the fermentation basket 500 includes tubular pipe legs 502 which support the basket within a fermentation tank so as to space the floor 504 of the basket from the floor of the tank. This configuration is adapted for use in tanks with sloped/flat bottoms as well as conical bottoms. When used on sloped tank floors or conical tank floors, the end 506 of each leg, or feet disposed thereon, can be coped or angled to match the slope of the tank floor. Additionally, the legs can be provided with pivotally connected foot pads that will simply pivot onto the floor surface. In this final embodiment, support structure for hanging the fermentation basket may also include hanging hooks and hanging brackets as described above in connection with other embodiments.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the claims set out herein.

What is claimed as invention is:

1. A fermentation basket for suspension in a fermentation tank during wine fermentation, comprising:
 a cylindrical upper section fabricated from heavy gauge stainless steel and a cylindrical lower section fabricated from a heavier gauge stainless steel than said upper section, wherein said upper and lower sections each include coupling structure for joining said upper and lower sections, said coupling structure comprising a circumferentially surrounding flange on a lower edge of said upper section and a circumferentially surrounding flange on an upper edge of said lower section, said flanges approximated and joined with a clamped coupling ring;

a perforated bottom side;

at least one perforated vertical side;

an open top side having an upper edge with a circumference or perimeter;

cable or chain connecting elements disposed around said upper edge for connecting a hoist cable or chain to hoist said filtration basket; and hanging structure disposed around said upper edge for suspending said filtration basket in the interior of a fermentation tank such that said bottom side is spaced apart from the bottom of the fermentation tank.

2. The fermentation basket of claim 1, wherein said at least one perforated vertical side is a continuous cylindrical wall.

3. The fermentation basket of claim 1, wherein said lifting structure comprises evenly spaced lifting tabs.

4. The fermentation basket of claim 1, wherein said upper and lower sections have a closely matching outer diameter.

5. The fermentation basket of claim 1, further including opposing pairs of forklift fork pockets on said lower section.

6. The fermentation basket of claim 1, further including opposing pairs of forklift fork pockets on said lower section.

7. The fermentation basket of claim 1, further including a standoff platform disposed on said bottom side.

8. The fermentation basket of claim 7, wherein said standoff platform comprises a plurality of radially arrayed tubes.

9. The fermentation basket of claim 1, wherein said hanging structure includes a plurality of hanging hooks disposed around said upper edge of said fermentation basket.

10. The fermentation basket of claim 1, further including a plurality of connecting holes for attaching a cable or chain for use with a lift or crane to lift and lower the fermentation basket.

11. The fermentation basket of claim 1, wherein said at least one perforated side includes four contiguous sides forming a cuboid-shaped basket.

12. The fermentation basket of claim 11, wherein said hanging structure comprises four equally sized circle segments, one each extending generally normal to one of said vertical sides.

13. The fermentation basket of claim 12, wherein said circle segments are welded normal to said sides.

14. The fermentation basket of claim 12, wherein said circle segments comprise bends in each of said vertical sides.

15. The fermentation basked of claim 12, wherein said circle segments form a continuous annular edge.

\* \* \* \* \*